United States Patent [19]

Mergelsberg et al.

[11] Patent Number: 5,167,981
[45] Date of Patent: Dec. 1, 1992

[54] METHOD OF CONTINUOUSLY PRODUCING HARD-CANDY MASSES

[75] Inventors: Reinhard Mergelsberg, Garbsen; Joé De Vilchez-Kehr, Hannover; Jürgen Schlüter, Lauenau; Klaus Markwardt, Laatzen, all of Fed. Rep. of Germany

[73] Assignee: Otto Hänsel GmbH, Hannover, Fed. Rep. of Germany

[21] Appl. No.: 664,443

[22] Filed: Feb. 27, 1991

Related U.S. Application Data

[63] Continuation of Ser. No. 403,765, Sep. 6, 1989, abandoned.

Foreign Application Priority Data

[30]

Jun. 25, 1988 [DE] Fed. Rep. of Germany ....... 3821505

[51] Int. Cl.$^5$ .......................... A23G 3/00; A23L 1/09
[52] U.S. Cl. .................................. 426/660; 426/515; 426/520; 426/804
[58] Field of Search ............... 426/658, 660, 804, 515, 426/520, 523

[56] References Cited

U.S. PATENT DOCUMENTS

| | | | |
|---|---|---|---|
| 3,438,787 | 4/1969 | DuRoss | 426/660 |
| 3,556,811 | 1/1971 | Smith | 426/660 |
| 3,632,357 | 1/1972 | Childs | 426/660 |
| 3,687,691 | 8/1972 | Adelstein et al. | 426/660 |
| 4,154,867 | 7/1979 | Aldrich et al. | 426/660 |
| 4,292,337 | 9/1981 | Andersen | 426/660 |
| 4,311,722 | 1/1982 | Vink et al. | 426/804 |
| 4,497,846 | 2/1985 | Boursier et al. | 426/660 |
| 4,528,206 | 7/1985 | Kastin | 426/660 |

Primary Examiner—Arthur L. Corbin
Attorney, Agent, or Firm—Max Fogiel

[57] ABSTRACT

A method of continuously producing hard-candy masses from an aqueous solution of starting ingredients by boiling and condensing the solution, subjecting it to a vacuum, condensing it further and cooling it, adding flavorings, dyes, etc., and finally cooling it again and shaping it into candy. The starting ingredients are sugar substitutes and the solution is subjected to a vacuum as early as while it is being boiled and while it is being condensed and will accordingly have a temperature that is low enough for conventional flavorings, a viscosity that is high enough for conventional cooling and tempering, and a low enough residual-water content.

9 Claims, 2 Drawing Sheets

METHOD OF CONTINUOUSLY PRODUCING HARD-CANDY MASSES

The present application is a continuation of parent application Ser. No. 403,765 filed Sep. 6, 1989, now abandoned.

BACKGROUND OF THE INVENTION

The invention concerns a method of continuously producing hard-candy masses from an aqueous solution of starting ingredients by boiling and condensing the solution, subjecting it to a vacuum, condensing it further and cooling it, adding flavorings, dyes, etc., and finally cooling it again and shaping it into candy. The device for carrying out the method has a steam-heated coil-type boiler followed by a condenser, a vacuum chamber, and an extractor. The method is continuous and the device operates continuously.

A method and device of the aforesaid type are known from German Patent 3 336 187. The starting ingredients are sucrose and glucose syrup in an aqueous solution. This method and device accordingly concern the production of conventional hard sugar candy, candy made of or involving sugar. Once the starting ingredients have been mixed into and dissolved in the water, the solution is boiled in one or even in two stages in a coil-type boiler. The solution is pumped through the coil and heated with steam. The steam condenses on the tubing in the coil and heats the solution. The solution, which can be as hot as approximately 140° C., travels from the boiler into an adjacent condenser, and the vapors are exhausted into the atmosphere. The resulting material can be approximately 97% dry. This solution, or mass, travels from the condenser into a chamber where it is subjected to a vacuum.

The reduction in pressure re-initiates boiling. The resulting vapors are exhausted with the same pump that establishes the vacuum. The mass accordingly cools down further and become even drier and more viscous. The residual water content may be as low as approximately 1.5%. Below the vacuum chamber is a screw that conveys the mass to a mixer, wherein flavorings, dyes, etc. and optionally air can be added to it. The mass must be viscous enough when it arrives in this extractor to ensure a seal that will permit maintenance of the vacuum. The mass is then conventionally cooled, shaped, and further processed. There are no problems in processing conventional sugar-based masses in these known systems.

In the continuous production of sugarless hard-candy masses, those that involve such sugar substitutes as xylitol, sorbitol, palatinitol, etc., the results of the known method are not satisfactory. The reason for this negative outcome is that the viscosity of a sugarless candy mass differs from that of a mass that contains sucrose and glucose syrup. At the same temperature and solids content, the viscosity of a sugarless mass will be substantially lower than that of a mass based on sucrose and glucose syrup. The sugarless mass will accordingly be much too fluid to ensure enough of a seal to maintain a vacuum in the extractor below the vacuum chamber. When starting ingredients in the form of sugar substitutes are handled in the production of hard-candy masses in the same way as the conventional sugar and glucose-syrup masses, the boiling stage cannot be followed by a vacuumizing stage because the continuously operating extractor can only apply enough pressure to maintain a constant vacuum when the mass being extracted has a system-dictated minimum viscosity.

One strategy that might suggest itself for combating the aforesaid problem in the production of hard-candy masses with starting ingredients in the form of sugar substitutes is to boil the solution at a high temperature, at up to approximately 165° C., to reduce the content of residual water. Once a residual-water content of 1.5% has been attained at approximately 165° C. for example, the vacuumization step will not, due to the small amount of residual water that can still evaporate, significantly alter the product (recooling by re-evaporation). Boiling the solution at as high as approximately 165° C., however, also entails considerable drawbacks. First, the steam supply must be readjusted unless the device is to be operated at a lower output. Most flavorings are sensitive to heat, and only those that can resist relatively high temperatures can be employed. In spite of this, however, the resulting mass will still be too fluid, meaning that its viscosity will be too low to satisfy the special conditions involved in the further processing.

SUMMARY OF THE INVENTION

The object of the present invention is to provide a method and a device that will make it possible to produce hard-candy masses with starting ingredients in the form of sugar substitutes, whereby the masses will act technically like masses with starting ingredients that contain sugar. The resulting hard-candy mass shall in particular be viscous enough for the subsequent cooling and tempering.

This object is attained in accordance with the invention in a method of the type initially described in that the starting ingredients are sugar substitutes and in that the solution is subjected to a vacuum as early as while it is being boiled and while it is being condensed and will accordingly have a temperature that is low enough for conventional flavorings, a viscosity that is high enough for conventional cooling and tempering, and a low enough residual-water content. The invention accordingly does not follow the obvious path of boiling at a high temperature, but just the opposite. Since vacuum occurs up to at least partway through the boiler coil even during the boiling process, the boiling will be more powerful even though the temperature is comparatively low. The temperatures of the solution will accordingly not exceed the range typical of sugar-containing masses. Furthermore, the mass will also be subjected to vacuum while it is being condensed, resulting in a high solids content at an intentionally lower temperature. The comparatively low boiling temperature will maintain a high output even when the supply of stem is limited. The lower temperature of the mass is also practical because conventional flavorings can be employed. The mass will have a high viscosity and will accordingly flow thickly enough to allow a vacuum to be both established and maintained. It will on the other hand also be possible to use existing extractors without modification. Still another advantage is that the method of processing sugar-based masses will need to be modified very little. The engineering parameters range within similar limits, an advantage from the production aspect. The method makes it possible to build plants and equipment that can be employed for producing hard-candy masses with both sugarless and sugar-based starting ingredients as desired. The expenditure will be minimum. Finally, the output will be high even when the supply of steam is limited.

The aqueous solution can be further condensed at a temperature of less than 140° C. and a vacuum of down to 0.05 bars absolute, resulting in a solids content of at least 98.5%. These levels are for the vacuum chamber and can fluctuate in accordance with the particular sugar substitute employed.

The aqueous solution can be subjected to further condensation in the vacuum chamber following the boiling and initial condensation. This procedure also results in further cooling.

The device for carrying out the method in accordance with the invention is characterized in that the condenser is sealed off from the atmosphere, in that the vacuum chamber communicates with the condenser such that the chamber vacuum, with the pressure increased enough to force the mass from the condenser into the vacuum chamber, can also act in the condenser and in the boiler coil. The overall section between the coil and the vacuum chamber and upstream of the extractor is accordingly subjected to vacuum, with the pressure lowest in the vacuum chamber and detectable at a higher level in the condenser and extractor as well. There will therefore be no difference in pressure between the two spaces, which can of course both be subjected to the same vacuum generator.

When sugar is employed as a starting ingredient, a valve between the condenser and the vacuum chamber varies the flow resistance of the solution. When a sugar-based hard-candy mass is being produced, the valve is adjusted to obtain the requisite pressure difference and, when a mass that employs sugar substitutes is being produced, the valve will be extensively open.

The condenser can communicate with the atmosphere through a line that contains a shut-off valve to establish and interrupt communication between the condenser and the atmosphere depending on the type of starting ingredients employed. A shut-off valve of this type can also act as a safety valve.

BRIEF DESCRIPTION OF THE DRAWINGS

A preferred embodiment of the invention will now be described with reference to the drawings, wherein.

DESCRIPTION OF THE PREFERRED EMBODIMENTS

Figure 1:
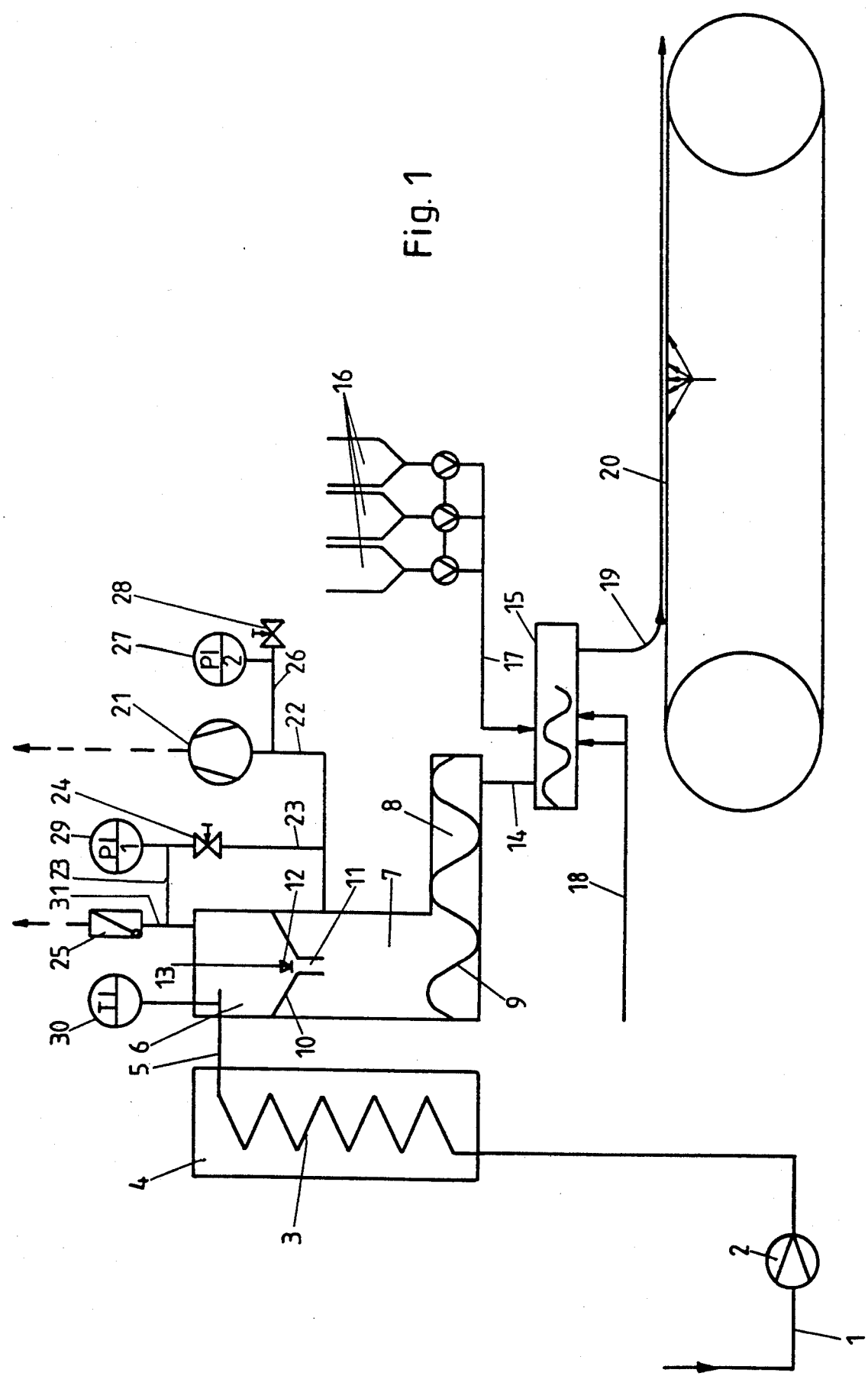
FIG. 1 is a schematic representation of the device for carrying out the method and FIG. 2 is a graph of boiling points in relation to solids content.

FIG. 1 illustrates only the components essential to comprehension of the present invention. It will be obvious that the starting ingredients are proportioned in accordance with the particular recipe and are converted into an aqueous solution that can be boiled in an initial unillustrated coil-type boiler, in a first step, that is. The ingredients are dissolved free of crystals in this first step to an initial state with a water content of 20% for example. A pipeline 1 conveys the solution by way of a metering pump 2 into the coil 3 of a steam-heated boiler 4. As the steam condenses on coil 3, it transfers its heat to the solution. Boiler 4 communicates with a downstream condenser 6 by way of a connecting line 5. The solution condenses into a mass inside condenser 6, wherein the water that evaporates in coil 3 occurs in the form of exhaust vapor. Downstream of condenser 6 is a vacuum chamber 7 that leads into an extractor 8, the essential component of which is a special driven conveying screw 9. Between condenser 6 and vacuum chamber 7 is a funnel-shaped partition 10. Associated with its spout 11 is the body 12 of a valve 13 that varies its cross-section to establish the desired flow resistance. A line 14 extends from the end of extractor 8 to a mixer 15. Additives can be introduced into mixer 15 and accordingly into the mass being mixed therein from containers 16 for dyes, flavorings, acid etc. by way of another line 18. As it exits mixer 15, the still hot and plastic mass is deposited in the direction indicated by arrow 19 onto a conveyor belt 20, whereon it is cooled and tempered. Downstream of the belt are conventional further-processing stations.

The suction end of a vacuum generator 21 communicates with vacuum chamber 7 by way of a line 22. Another line 23 branches off line 22 to condenser 6. Accommodated in line 23 is a valve 24 that establishes the ratio between the vapors exhausted from vacuum chamber 7 and those exhausted from condenser 6. Line 23 can also communicate with another line 31 that leads into the atmosphere from condenser 6 and accommodates a shut-off valve 25. Accommodated in either line 22 or a branch 26 is a manometer 27. Branch 26 terminates in a valve 28 that adjusts the vacuum. Line 23 accommodates another manometer 29. At the end of connecting line 5 that opens into condenser 6 is a thermometer 30 that monitors the temperature at that point.

How this device operates will now be described.

The aqueous solution of starting ingredients, especially sugar substitutes, with a water content of approximately 20% is conveyed into the boiler by way of pump 2 and pipeline 1 and is boiled therein until the mass entering condenser 6 has a temperature of approximately 140° C. and a solids content of approximately 97%. The mass is condensed in condenser 6, and the vapors are exhausted, when shut-off valve 25 is closed, out of line 31 and into line 23 by way of valve 24 and line 22 by vacuum generator 21. The amount flowing through spout 11 is accordingly already correspondingly reduced, and the mass enters vacuum chamber 7 through a valve 13 that is comparatively open. Further condensation occurs in vacuum chamber 7 subject to the vacuum therein. The pressure in vacuum chamber 7 can be decreased to approximately 0.05 at abs. It will be obvious that a difference in pressure must exist to force the mass through spout 11. The pressure in condenser 6 will accordingly be higher by that difference. The pressure at this point can be approximately 0.3 bars abs. The vacuum will accordingly act not only in vacuum chamber 7 but also in condenser 6. It even extends into the coil 3 in boiler 4 but disappears gradually over the length of the coil. The vacuum is accordingly already taking effect while the solution is being boiled in boiler 4, which is a practical for keeping the temperature low during the boiling process when the starting ingredients are sugar substitutes. The result is advantageously high viscosities. The setting of valve 24 ensures the desired or requisite difference in pressure between condenser 6 and vacuum chamber 7. Valve 28 on the other hand primarily establishes the absolute dimension of the vacuum in vacuum chamber 7. The low temperature and high viscosity of the mass result in the particular advantage that conventional flavorings can be introduced into mixer 15 from containers 16. The mass in extractor 8 is viscous enough to ensure that the intentionally low absolute pressure in vacuum chamber 7 can also be exploited.

Figure 2:
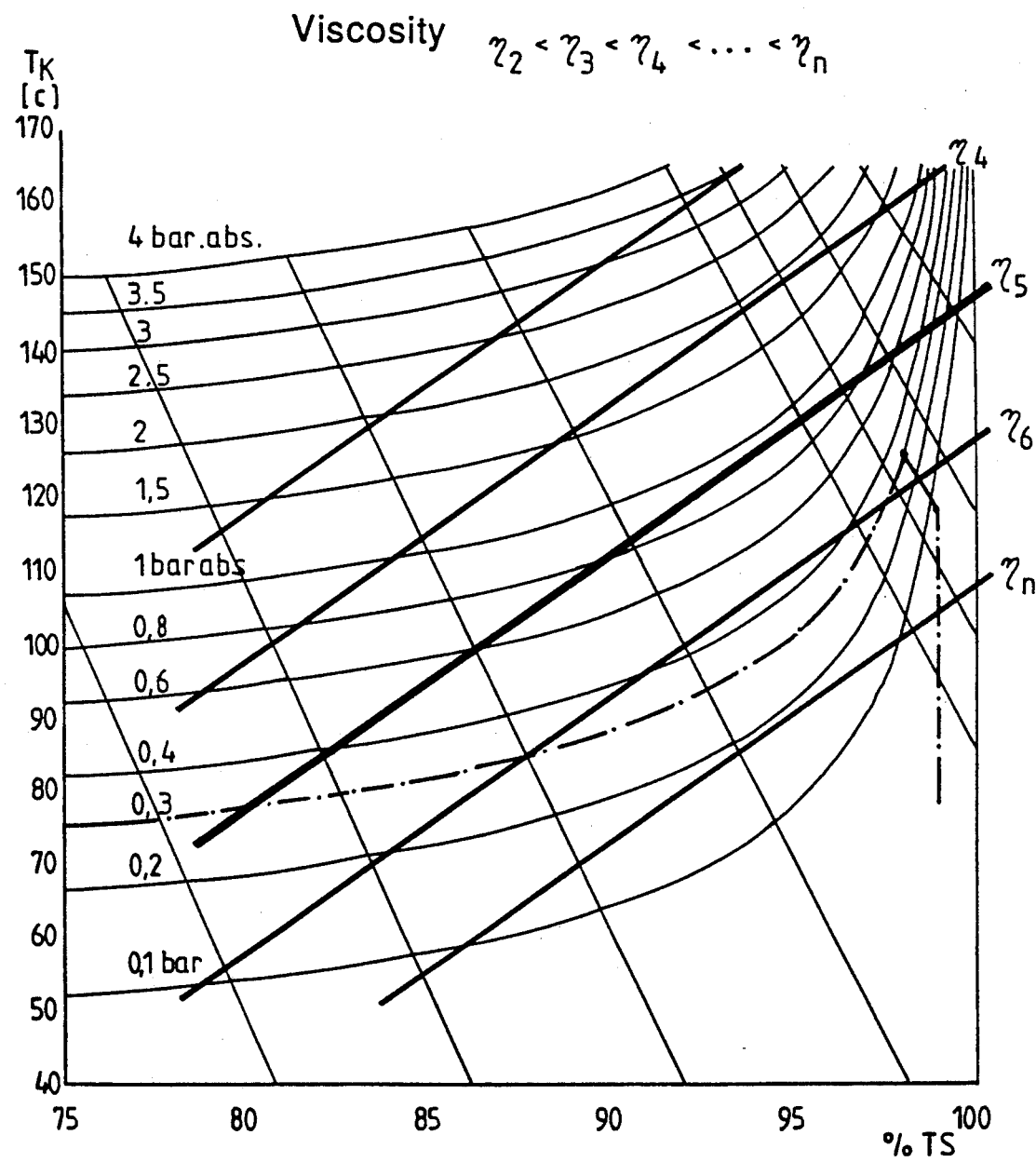

FIG. 2 is a chart of boiling points in terms of the solids content in percent and illustrates what occurs as the solution or mass is processed. The boiling points are plotted in curves that slope progressively upward from left to right. The absolute pressures extend straight up. It will be evident that, at a low absolute pressure, it is practical to boil at low temperatures. Also in the graph is a sheaf of straight lines of equal viscosity $\eta$ that slope up from left to right. The lowest line is the line of highest viscosity. Sloping down from left to right is a sheaf of straight lines that represent the condensation that accompanies the second vacuum stage in vacuum chamber 7. When for example a sugar substitute is being processed that must have a viscosity of at least $\eta_5$ to ensure the generation and maintenance of the requisite vacuum in vacuum chamber 7, the solution will be boiled for example at the points represented by the dot-and-dash curve and at a vacuum of 0.3 bars, whereby the solids content will increase as the boiling continues. Once the mass enters condenser 6, however, the 0.3 bar curve of boiling points will be abandoned. Due to the subsequent vacuumization in vacuum chamber 7, the curve will now parallel the straight downward slope of the second vacuum stage as far as a point that represents the desired solids content, which can for example be 99%. In this state, the mass is transferred from extractor 8 to mixer 15 and can have a temperature of 118° C. for example.

We claim:

1. A method for producing hard-candy masses in a continuous process from an aqueous solution of starting ingredients in the form of sugar substitutes, comprising the steps of: boiling the solution; subjecting the solution to a vacuum during said boiling step to produce a first condensing step; condensing the solution further in a second condensing step; condensing the solution further in a second condensing step and cooling the solution after boiling under vacuum, maximum temperature being attained in said second condensing step, said first condensing step and said second condensing step being carried out according to a predetermined temperature-time function for limiting the temperature so that the solution has a temperature low enough for conventional flavorings, a viscosity high enough for conventional cooling and tempering, and a sufficiently low residual-water content after said cooling and boiling under vacuum steps; adding flavorings, dyes, and predetermined ingredients after said second condensing step; cooling the solution again; and dividing the solution into candy; all aforesaid steps running continuously in said continuous process.

2. A method as defined in claim 1, wherein said second condensing step is carried out at a temperature of less than 140° C. and at a vacuum down to 0.05 bars absolute with a resulting solids content of at least 98.5%.

3. A method as defined in claim 1, wherein said second condensing step is carried out in a vacuum chamber following said boiling step and said first condensing step.

4. A method for producing hard-candy masses in a continuous process from an aqueous solution of starting ingredients in the form of sugar substitutes, comprising the steps of: boiling the solution in a steam-heated coil-type boiler; subjecting the solution to a vacuum in a vacuum chamber during said boiling step to produce a first condensing step; condensing the solution further in a condenser sealed off from the atmosphere in a second condensing step and cooling the solution after boiling under vacuum, maximum temperature being attained in said second condensing step, said vacuum chamber communicating with said condenser, said first condensing step and said second condensing step being carried out according to a predetermined temperature-time function for limiting the temperature so that the solution has a temperature low enough for conventional flavorings, a viscosity high enough for conventional cooling and tempering, and a sufficiently low residual-water content after said cooling and boiling under vacuum steps; adding flavorings, dyes, and predetermined ingredients after said second condensing step; cooling the solution again; and dividing the solution into candy; all aforesaid steps running continuously in said continuous process.

5. A method as defined in claim 4, wherein the vacuum chamber communicates with said condenser through controls distributing vacuum between said condenser and said vacuum chamber.

6. A method as defined in claim 4, including the step of providing said condenser and said vacuum chamber as integrated elements.

7. A method as defined in claim 4, including the step of providing a valve between said condenser and said vacuum chamber for varying flow resistance of the solution when sugar is a starting ingredient.

8. A method as defined in claim 7, including the step of providing a line with a shut-off valve communicating with said condenser, said condenser communicating with the atmosphere through said line with said shut-off valve.

9. A method for producing hard-candy masses in a continuous process from an aqueous solution of starting ingredients in the form of sugar substitutes, comprising the steps of: boiling the solution; subjecting the solution to a vacuum during said boiling step to produce a first condensing step; condensing the solution further in a second condensing step and cooling the solution after boiling under vacuum, maximum temperature being attained in said second condensing step, said first condensing step and said second condensing step being carried out according to a predetermined temperature-time function for limiting the temperature so that the solution has a temperature low enough for conventional flavorings, a viscosity high enough for conventional cooling and tempering, and a sufficiently low residual-water content after said cooling and boiling under vacuum steps; adding flavorings, dyes, and predetermined ingredients after said second condensing step; cooling the solution again; and dividing the solution into candy, said second condensing step being carried out at a temperature of less than 140° C. and at a vacuum down to 0.05 bars absolute to result in a solids content of at least 98.5%; said second condensing step being carried out in a vacuum camber following said boiling step and said first condensing step; all aforesaid steps running continuously in said continuous process.

* * * * *